United States Patent [19]

Katz

[11] Patent Number: 5,216,502
[45] Date of Patent: Jun. 1, 1993

[54] SURVEILLANCE SYSTEMS FOR AUTOMATICALLY RECORDING TRANSACTIONS

[76] Inventor: Barry Katz, 503 Cindy Cir., Penllyn, Pa. 19422

[21] Appl. No.: 629,255

[22] Filed: Dec. 18, 1990

[51] Int. Cl.$^5$ ............................................. H04N 7/18
[52] U.S. Cl. .................................... 358/108; 358/105
[58] Field of Search ................. 358/108, 93, 183, 102, 358/105, 209, 903

[56] References Cited

U.S. PATENT DOCUMENTS

| | | | |
|---|---|---|---|
| 3,935,380 | 1/1976 | Coutta | 358/108 |
| 4,120,004 | 10/1978 | Coutta | 358/108 |
| 4,237,483 | 12/1980 | Clever | 358/108 |
| 4,337,482 | 6/1982 | Coutta | 358/108 |
| 4,630,110 | 12/1986 | Cotton | 358/108 |
| 4,821,118 | 4/1989 | Lafreniere | 358/108 |
| 4,864,108 | 9/1989 | Hamada et al. | 235/379 |
| 4,991,008 | 2/1991 | Nama | 358/108 |

FOREIGN PATENT DOCUMENTS

| | | |
|---|---|---|
| 0221631 | 5/1987 | European Pat. Off. . |
| 62-140272 | 6/1987 | Japan . |
| 2-176859 | 7/1990 | Japan . |
| 2140650 | 11/1984 | United Kingdom . |
| 2177245 | 1/1987 | United Kingdom . |

*Primary Examiner*—Michael T. Razavi
*Assistant Examiner*—Tuan V. Ho
*Attorney, Agent, or Firm*—Volpe and Koenig

[57] ABSTRACT

A system for making and reviewing video recordings of transactions occurring at cashier lanes uses a television camera for developing frames of video signals of the transactions at two or more cashier lanes. A register at each lane generates digital signals representing events that occur at the lanes. A computer responsive to the digital signals generates a digital transaction signal. A VCR records the camera video signal and the computer digital transaction signal on a cassette, the digital transaction signal being recorded in a certain relation (e.g. in synchrony) with the camera video signal and in such a manner as to substantially not affect the clarity of each video frame. In a playback mode, the VCR generates a playback video frame signal, and the computer generates an overlay control signal. An overlay means responsive to various signals generates a composite video signal of an alpha-numeric display of the digital transaction information relating to the desired cashier lane overlaying the video signal, the alpha-numeric information being positioned in the composite video signal so as not to obscure that portion of the video frame that pertains to the desired cashier lane. In another aspect of the invention, a computer responds to the register signals and generates a video storage signal at the start of a subsequent transaction and a transaction summary signal. The overlay means generates a summary snapshot video frame signal comprising alpha-numeric transaction summary information overlaying the picture of the merchandise at the start of the transaction.

18 Claims, 4 Drawing Sheets

SURVEILLANCE SYSTEMS FOR AUTOMATICALLY RECORDING TRANSACTIONS

TECHNICAL FIELD

This invention relates to surveillance systems for recording, for later review, transaction events that occur simultaneously at a plurality of transaction lanes. These transaction events can include operator key entries, automatic data entries, sensed operator behavior and other sensed events that represent elements of a transaction. More particularly, this invention is directed to a surveillance system in which, during the review of the recording, a composite alpha-numeric display of status and transaction data related to any selected transaction lane can be selectively positioned with respect to the video image of the selected transaction so that a high level of picture resolution and clarity of the video representation of the selected transaction can be preserved upon replay.

BACKGROUND ART

The use of surveillance systems to record cash transactions for later review are well known in the art. For example, U.S. Pat. No. 4,337,482—Coutta, discloses a surveillance system that monitors and records transactions that occur at a number of cashier lanes. In Coutta, a single television camera, mounted on a rail, can be positioned to make a video recording of the transactions that occur at a single selected cashier lane. At column 4, lines 25-42, Coutta discloses that the digital transaction data from the cash register in the selected cashier lane is fed into a video character generator to provide a composite video picture, illustrated in FIG. 6, in which an alpha-numeric description of the transaction data overlays the video image of the transaction. When, as provided in Coutta, a composite video image is generated with alpha-numeric information relating only to a single cashier lane, it is usually possible to position the camera so that the alpha-numeric overlay does not obscure a useful portion of the recorded video image. However, if a single camera is used to record simultaneously the transactions that occur at a plurality of cashier lanes, it is likely that the alpha-numeric overlay data will obscure an important part of the video image of at least one of the transaction lanes. This likelihood is further increased when a large number of parameters are displayed simultaneously for all of the cashier lanes.

U.S. Pat. No. 4,630,110—Cotton, et al., discloses a surveillance system which monitors and records the signals from a number of video cameras. In the example illustrated in FIG. 3A of Cotton, et al, the video images from 4 cameras are combined, two of the cameras being focused on cash registers. Beginning at column 8, line 65, Cotton et al. discloses that textual information can be displayed at the lower portion of the combined display and that certain prior art systems used the audio track of a video cassette recorder to store the data to be displayed.

Another prior art surveillance system, as disclosed in U.S. Pat. No. 4,145,715—Clever, generates two levels of surveillance recordings. The first level, generated by tape recorder 42, contains a record of all transactions while the second level, generated on tape recorder 54 contains only selected transactions. As stated at column 4, lines 18-22, transaction data such as price and department number go to a character generator 32, and, as stated at column 3, lines 45-68, and at column 5, lines 17-28, the character generator output is mixed with the video image to create a composite video frame recorded by the video tape recorder (VTR) 42. This composite video frame consists of alpha-numeric transaction data which overlays the transaction video image. The Clever patent also discloses at column 4, lines 28-32 and at column 5, lines 21-23, that digital information is stored in the leader 50 of each frame. Beginning at column 8, line 67, Clever describes a system in which a single camera scans several point-of-sale stations. Although Clever discloses that a single camera can be used to scan several point-of-sale stations, Clever records a video image that contains alpha-numeric transaction data that overlays the video transaction image. This overlay can degrade the clarity of the resultant video transaction image. As the devices that read the bar codes on the articles being sold become more sophisticated, more alpha-numeric characters describing the transaction are generated for display which further tends to clutter and obscure the composite video image. As the number of lanes being recorded increases, it becomes more difficult to overlay all of the alpha-numeric transaction data at positions that will not obscure an important part of the video transaction image. The clarity of the video image of a transaction is particularly important when the transaction lanes are outdoors and are recorded under varying light and weather conditions.

The prior art surveillance recording systems make continuous video recordings of the transactions. If a typical transaction takes 3 minutes and 30 frames are recorded each second this results in 5400 frames being recorded for that transaction. I have found in many situations, such as for supermarket transactions, a quick check of the validity of the transaction can be obtained from a single video frame. Namely, a picture of the merchandise that is the subject of the transaction is viewed at the start of the transaction along with a summary, such as the cost of the goods totaled at the end of the transaction. It is believed that one transaction can be summarized in a single or perhaps 3 or 4 video frames thereby reducing the recording volume by a factor in the range of 1350 to 5400.

It is, therefore, one object of this invention to provide a surveillance recording system in which either single or multiple cameras simultaneously record transactions that occur at a plurality of lanes for recording as a frame of video on a single volume of a recording medium.

It is another object of this invention to record on the recording medium all of the status and transaction data associated with the video image of a transaction in a manner that preserves the clarity of the video image of the transaction.

Another object of this invention is to provide a surveillance recording system that records outdoor transactions and provides an alpha-numeric display of transaction data during playback.

Another object of this invention is to provide a surveillance recording system of transactions occurring in a plurality of cashier lanes in which, during the playback mode, the alpha-numeric status and transaction data associated with a selected cashier lane can be selectively positioned so as to generate a composite overlay video image in which the clarity of the video image at the selected cashier lane is not degraded.

And yet another object of the invention is to provide a system for making a snapshot summary video frame of a transaction consisting of a video frame of the goods at a cashier lane at the beginning of a transaction with an alpha-numeric summary overlay generated at the completion of the transaction.

SUMMARY OF THE INVENTION

In accordance with this invention, there is provided a system for video recording images of transactions that occur at two or more cashier lanes along with detailed information relating to those transactions on a single volume, such as a video casette or a video disc, of a recording medium. In one embodiment of the invention, the video recordings are made from a single camera that focuses on transactions occurring at two or more cashier lanes. In another embodiment of the invention, a camera is associated with each cashier lane and the video signals from all of the cameras are reduced and combined to provide a single composite video frame. Information relating to the transactions is generated by a register device at each lane such as a manually operated register or a bar code scanner. This information is recorded in digital form either on the audio channel of a video tape or in the first several lines or in the last several lines of the recorded video frame, so that during playback the clarity of the entire video picture is preserved. During the replay of the video, the digital transaction data is read out from the recording into a computer and the video recording is applied to one input of an overlay device. The computer extracts only the digital data relating to the transaction in a cashier lane of interest and sends it along with control information to another input of the overlay device. The overlay unit, which generates an alpha-numeric display describing the details of the transaction that overlay the video image being played back, uses the computer generated control information to position the alpha-numeric description over a portion of the video image that does not display the transaction at the cashier lane of interest.

In another aspect of this invention, instead of making a continuous recording of the transactions that occur at the cashier lanes, a single or perhaps several summary snapshot video frames are recorded for each transaction. If a single snapshot summary video is created, it consists of a single video frame that contains, for example: (1) a video image of the goods on a cashier lane conveyor at the start of the transaction, and (2) a brief alpha-numeric summary generated at the completion of the transaction. If the transaction includes many items, it may be desirable to generate an interim summary snapshot video after some number of items have been registered.

BRIEF DESCRIPTION OF THE DRAWINGS

While the specification concludes with claims particularly pointing out and distinctly claiming that which is regarded as the present invention, the objects and advantages of this invention can be more readily ascertained from the following description of a preferred embodiment when read in conjunction with the accompanying drawings in which corresponding parts are referenced throughout by similar numerals and related alphabetics, and in which:

| TABLE OF ABBREVIATIONS | |
|---|---|
| Ai: | Audio input |
| Ao: | Audio output |
| CP: | Computer |
| KB: | Keyboard |
| LC: | Lane controller |
| MC: | Message coordinator |
| MD: | Modem |
| MN: | Monitor |
| OV: | Video overlay generator |
| P: | Printer |
| QUAD: | Quadrant multiplexer |
| REG: | Cash register device |
| S1-Sn: | Sensors |
| VCR: | Video cassette recorder |
| Vi: | Video input |
| Vo: | Video output |

BEST MODE FOR CARRYING OUT THE INVENTION

Figure 1:
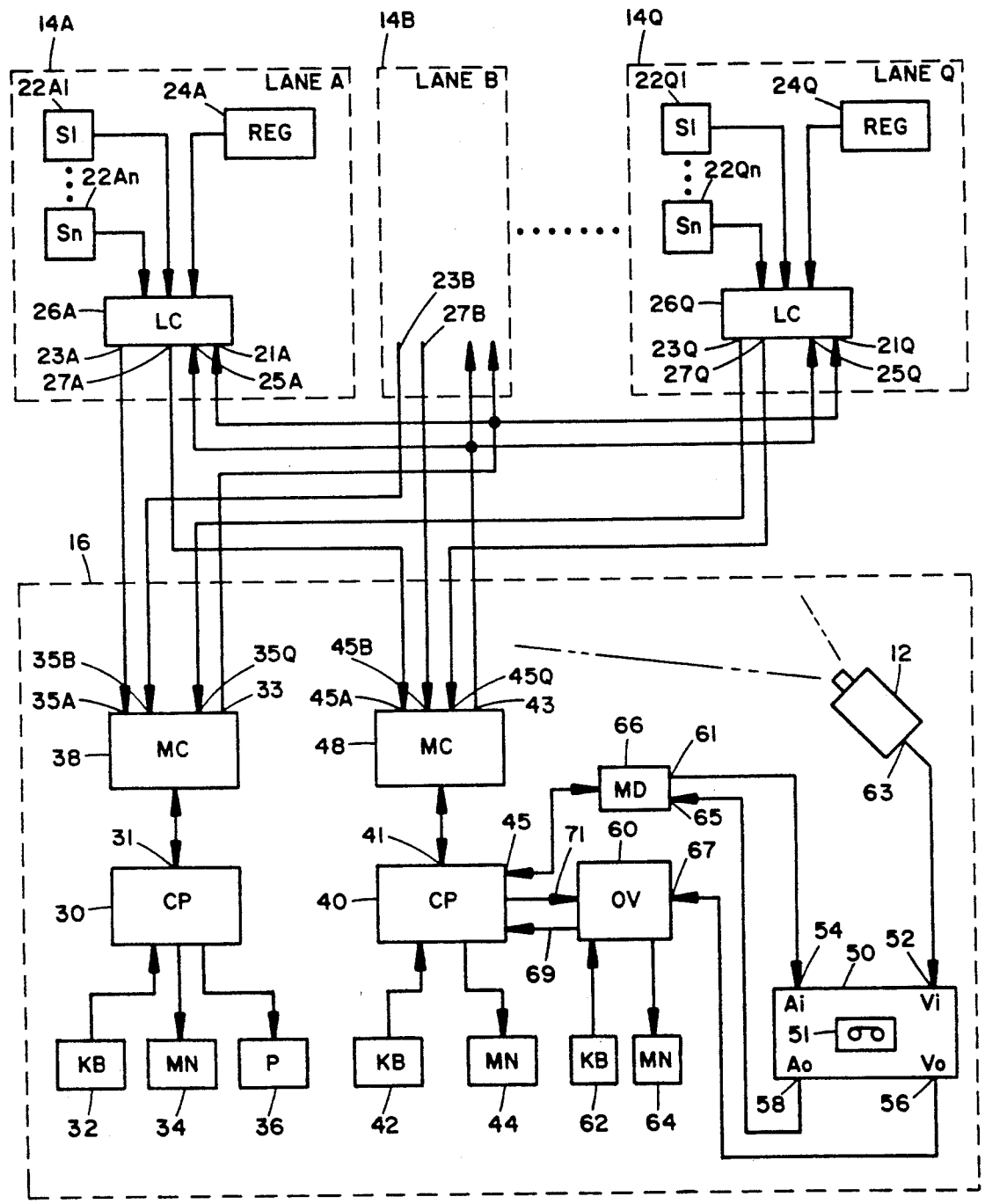
FIG. 1 is a schematic block diagram of a multi-transaction lane surveillance recording and playback system.

FIG. 1 is a block diagram of one embodiment of a Surveillance Recording and Playback System 10 in accordance with this invention. Although the Surveillance System 10 can be used in different environments such as a grocery store or convenience store, the system 10 of FIG. 1 can be viewed as providing surveillance of automotive vehicle toll booths, numbered from A to Q, such as those employed at turnpikes, tunnels or bridges. A television camera 12 creates a video signal of the lanes of automotive vehicles passing through the Q toll booths.

The equipment associated with each toll booth is shown enclosed in a dashed block 14. This equipment includes a plurality of sensors (S1-Sn) 22 which generate signals showing the status of certain equipment or indicating the occurrence of certain events, at or in the toll booth. As used herein, a transaction consists of all of the events that would relate to the collecting of the toll for one automotive vehicle. If the toll booth is manned, it will have a cash register device (REG) 24 having, for example, ten vehicle classification buttons which a toll booth operator uses to identify the class of vehicle that is passing through the toll booth. It will also be appreciated by one skilled in the art that a register 24 is a specific type of sensor device that responds to a cashier's or other person's action. The sensor 22 and register 24 outputs are applied to a lane controller 26.

In one embodiment of system 10, the following sensors 22 are employed:

| Sensor | Function |
|---|---|
| S1 | Hard reset of lane controller. |
| S2 | Soft reset of lane controller. |
| S3 | Lane controller on line. |
| S4 | Transaction data buffer overflow. |
| S5 | Lane controller tamper. |
| S6 | Vehicle axle over a first treadle. |
| S7 | Vehicle axle over a second treadle. |
| S8 | Treadle tamper. |
| S9 | Gate up. |
| S10 | Gate down. |

-continued

| Sensor | Function |
|--------|----------|
| S11 | Automatic Coin Machine tamper. |
| S12 | Cash vault removal. |
| S13 | Vehicle departure complete. |
| S14 | Lane just opened. |
| S15 | Lane just closed. |
| S16 | Operator Identification Card Reader. |

The tamper sensors normally operate when its associated equipment is being maintained or repaired, however, they can also operate when someone tampers with the equipment in some unauthorized manner.

Lane controllers 26 perform some processing of the sensor 22 and register 24 signals, generate some toll booth status information, and buffer and format the information until it can be transmitted to an Irregular Transaction Identification computer 30 and an Image Record and Playback computer 40 located in a control room, indicated by dashed block 16, remote from the toll booths. By way of example, for the Irregular Transaction Identification computer 30, lane controllers 26 combine the axle crossings sensed by treadle sensors S6 and S7 with the vehicle classification information from registers 24 to identify a vehicle transaction in accordance with the following logic:

(a) Normally a vehicle transaction begins with an axle passing over sensor S6 which initiates the counting of axle crossings detected by sensors S6 and S7. The end of the transaction is defined by (1) the pressing of one of the classification buttons on register 24, or (2) if the lane is open, passage of a maximum transaction time, or (3) if the lane is closed, the passage of an average expected transaction time.

(b) A lane transaction is also defined if a vehicle classification button on a register 24 is depressed even though no axle crossings have been sensed by sensors S6 and S7.

The Irregular Transaction Identification computer 30, located in the control room 16, has connected to it a keyboard (KB) 32, a monitor (MN) 34 and a printer (P) 36. A message coordinator (MC) 38 is connected to a standard input/output channel 31 of the computer 30. The output 33 of the message coordinator 38 is connected to inputs 21A-21Q of lane controllers 26A-26Q, and the outputs 23A-23Q of lane controllers 26 are applied to inputs 35A-35Q of message coordinator 38. The message coordinator 38, which can be considered a multiplexer, controls the flow of control messages from the Irregular Transaction Identification computer 30 to lane controllers 26 and the flow of lane transaction messages from the lane controllers 26 to the computer 30. All messages between the lane controllers 26 and the message coordinator 38:

(1) are coded in ASCII with each character being represented by a start bit, seven data bits and one stop bit;

(2) have each field separated by a space character;

(3) have as Field #1 a three character code identifying the message type;

(4) have as Field #2 a two character lane identification number, L#;

(5) have as the next to last field a 4 hexadecimal digit check sum, CS; and (6) have as the last field a single character ("next line") identifying the end of message, E.

All messages sent from the Irregular transaction computer 30 to the lane controllers 26 have only four fields: the message type field; the lane identification number field, L#; the check sum field, CS; and the end of message field, E. Since the control messages sent by the message coordinator 38 to the lane controllers 26 include a lane controller identification number, only the lane controller 26 with that identification number will respond. The format for control messages sent by computer 30 to lane controllers 26 is illustrated below.

| | | Fields | | | |
|---------|-------------|-----|----|----|----|
| Message | Description | #1 | #2 | #3 | #4 |
| 1 | Asks for next message | POL | L# | CS | E |
| 2 | Asks repeat of last message | RPT | L# | CS | E |
| 3 | Asks for a log-in message | BTO | L# | CS | E |
| 4 | Causes lane controller to erase and format its ram card. | FRC | L# | CS | E |

Messages sent from the lane controllers 26 to computer 30 have the following format:

| | | Fields | | | | | | | | | | |
|---------|-------------|-----|----|----|-----|-----|----|----|----|----|-----|-----|
| Message | Description | #1 | #2 | #3 | #4 | #5 | #6 | #7 | #8 | #9 | #10 | #11 |
| 1 | Vehicle | TRN | L# | ST | D/T | OP# | CL | S6 | S7 | SE | CS | E |
| 2 | Alert | ALR | L# | ST | D/T | COD | SE | CS | E | | | |

The definition of the fields not previously defined are as follows:

| | |
|-----|---|
| ST | One character status flag (O = Lane open; C = lane closed; L = immediate transaction; B = buffered transaction). |
| D/T | Twelve decimal digits: year, month, day, hours, minutes, and seconds. |
| OP# | Operator ID#, up to 5 decimal digits. |
| CL | Vehicle class, one hexadecimal character. |
| S6 | S6 axle crossings, one hexadecimal character. |
| S7 | S7 axle crossings, one hexadecimal character. |
| COD | Up to 4 decimal characters (See Table I). |
| SE | Up to 6 hexadecimal characters. |

TABLE I

| Alert Code (COD) | Definition |
|------|---|
| 1 | Lane controller tamper active |
| 2 | Lane controller tamper reset |
| 3 | Treadle box tamper active |
| 4 | Treadle box tamper reset |
| 5 | Image computer 40 offline |
| 6 | Image computer 40 online |
| 7 | Cash vault inserted |
| 8 | Cash vault extracted |
| 9 | Lane controller disabled |
| 10 | Lane open and lane controller disabled |
| 11 | Lane controller configuration changed |
| 12 | Computer 30 transaction buffer overflow |
| 13 | Computer 40 transaction buffer overflow |
| 14 | computer 30 buffer write protect on |
| 15 | computer 30 buffer write protect off |
| 16 | computer 30 buffer removed |
| 17 | computer 30 buffer inserted |
| 18 | power up reset |

TABLE I-continued

| Alert Code (COD) | Definition |
| --- | --- |
| 19 | soft reset |
| 20 | computer 30 offline |
| 21 | computer 30 online |
| 22 | lane controller error |
| 23 | operator ID card reader parity error |
| 24 | operator ID card reader test error |
| 25 | Operator ID card read but lane failed to open |
| 26 | lane open no valid operator ID |
| 27 | computer 30 buffer battery low |
| 28 | computer 30 buffer cleared |

The function of Irregular Transaction Identification Computer 30 is to receive the status and transaction data from all of the lanes and to process that information to identify any irregular transactions. The Irregular Transaction Identification computer 30 processes, either on-line or off-line, all of the vehicle transaction messages and the alert messages it receives from the lane controllers 26 to identify both valid transactions and transactions or events that appear to be irregular. As an example of the type of processing that computer 30 performs, because the passage of an inordinate length of time causes the generation of a vehicle transaction message by the lane controller 26, a single valid vehicle transaction can result in the generation of two lane controller 26 vehicle transaction messages that appear to be irregular: the first apparently irregular transaction message being generated when the inordinate length of time is exceeded, and the second apparently irregular transaction message being generated when the class button is later depressed by the toll booth operator. The Irregular Transaction Identification Computer 30 is able to determine that the two messages define one valid vehicle transaction rather than two irregular transactions. After processing all of the vehicle messages and the alert messages to identify any irregular vehicle transactions, the computer 30 can print a list of the irregular transactions on the printer 36 so that an operator can review those apparent irregular transactions in greater detail at some later time. As an example of some other irregular transactions that can be identified are: (1) activity in a closed lane, and (2) vehicles passing through an unmanned booth without paying. Computer 30 can also provide certain operator efficiency reports such as determining that certain operators take much longer per transaction than other operators under similar traffic conditions. The irregular transactions, irregular events, or operator efficiency data are printed out on the printer 36 and a supervisor can later use this printout to review the recorded transactions in greater detail.

Also located in the control room 16 is an Image Record and Playback Computer 40 that has connected to it a keyboard (KB) 42 and a monitor (MN) 44. Computer 40 also has connected to it standard input/output channel 41 a message coordinator (MC) 48 that controls the flow of control messages from computer 40 to the lane controllers 26 and the flow of lane transaction and event messages from the lane controllers 26 to the computer 40 in much the same way that message coordinator 38 controls the flow of messages between lane controllers 26 and computer 30. The output 43 of message coordinator 48 is connected to inputs 25A-25Q of lane controllers 26 and the outputs 27A-27Q of lane controllers 26 are applied to inputs 45A-45Q of message coordinator 48. All messages sent between the message coordinator 48 and the lane controllers 26:

(1) use ASCII-coded characters having one start bit, 7 data bits and one stop bit;

(2) have fixed length fields with adjacent fields packed (i.e. no space separates the fields);

(3) have as Field #1 a one character message type;

(4) have as the next to last field a two hexadecimal digit check sum; and (5) have as the last field a one character (new line) end of message.

The control messages sent from the Image Record and Playback computer 40 to lane controllers 26 are formatted as follows:

| | | Field | | | |
| --- | --- | --- | --- | --- | --- |
| Message | Function | #1 | #2 | #3 | #4 |
| 1 | Asks for the next message | P | L# | CS | E |
| 2 | Asks repeat of last message | R | L# | CS | E |
| 3 | Asks for operator ID# | B | L# | CS | E |
| 4 | Asks for start or stop time of the current or last operator | U | L# | CS | E |
| 5 | Sets date/time in all lane controllers 26 | T | D/T | CS | E |

The format of data messages sent from the lane controllers 26 to the Image Record and Playback computer 40 is given below:

| | | Fields | | | | | |
| --- | --- | --- | --- | --- | --- | --- | --- |
| Message | Description | #1 | #2 | #3 | #4 | #5 | #6 |
| 1 | Event message | E | L# | EVT | CS | E | |
| 2 | Operator card number | C | L# | S | ID# | CS | E |
| 3 | No activity since last message | N | L# | CS | E | | |
| 4 | Operator stop or start time | O | L# | TIM | CS | E | |

The definition of the fields not previously described are:
L# Two digit hexadecimal lane number.
D/T Twelve decimal digits for year, month, day, hour, minute and second.
EVT Three hexadecimal digit event code as listed in Table II below.
S One decimal digit check code (0=check out; 1=check in; 2=lane closed; and 3=lane open)
OP# Five hexadecimal digit card number.
TIM Six decimal digit start or stop time as hours, minutes and seconds.

TABLE II

| Code | Description |
| --- | --- |
| 000 | Lane controller hard reset |
| 001 | Lane Controller soft reset |
| 002 | Lane Controller Online to computer 40 |
| 003 | Message for computer 40 lost (buffer overflow?) |
| 004 | Lane Controller tamper true |
| 005 | Lane controller tamper reset |
| 006 | ACM Composite tamper true |
| 007 | ACM Composite tamper reset |
| 008 | Treadle tamper true |
| 009 | Treadle tamper reset |
| 00A | Vault removal true |
| 00B | Vault removal reset |
| 010 | Axle over S6 treadle, lane open |

TABLE II-continued

| Code | Description |
| --- | --- |
| 020 | Axle over S7 treadle, lane open |
| 030 | Axle over S6 treadle, lane closed |
| 040 | Axle over S7 treadle, lane closed |
| 050 | Exit Loop true |
| 060 | Exit loop reset |
| 070 | Gate up |
| 080 | Gate down |
| 090 | Lane just opened |
| 100 | Class 1 button |
| 200 | Class 2 button |
| 300 | Class 3 button |
| 400 | Class 4 button |
| 500 | Class 5 button |
| 600 | Class 6 button |
| 700 | Class 7 button |
| 800 | Class 8 button |
| 900 | Class 9 button |
| A00 | Class 10 button |

Another standard input/output channel 45 of the computer 40 is connected to a modem (MD) 66. The output 61 of the modem 66 is connected to the audio input channel 54 of a Video Cassette Recorder (VCR) 50 and the output 63 of the video camera 12 is connected to the video input 52 of the VCR 50. Also connected to the computer 40 is a video overlay generator (OV) 60. The overlay generator receives data from the computer 40 over line 71 and sends data to the Image Record and Playback computer 40 over line 69. A keyboard (KB) 62 and a monitor (MN) 64 is also connected to the overlay generator 60. The audio output 58 of the VCR 50 drives the input 65 of the modem 66 and the video output 56 of the VCR drives the video input 67 of the overlay generator 60.

In a Record mode of operation, the function of Image Record and Playback computer 40 is to receive the status and transaction messages from the lane controllers 26 in each toll booth and to format all of this information for recording on the audio input channel 54 of the video cassette recorder 50 simultaneously with the frames of video of the vehicles passing through the toll booths being recorded at the video input 52 of the video cassette recorder 50. In addition to recording the information on the tape as received from the lane controllers 26, the computer 40 also causes other information to be periodically recorded on the tape to help the operator review the tape in the Playback mode. Examples of the data that are recorded are: operator number, lane number that a particular operator is in, operator start time, lane status, time, S6 and S7 treadle counts, vehicle class number counts, information that locates the coordinates of each lane in the picture on the monitor, and the coordinates on the monitor where a sprite (indicator over a lane to be monitored) can be positioned.

In a Playback mode of operation, it is the function of computer 40 to control the overlay of digital transaction information related to a transaction lane of interest, at a position on the monitor that does not substantially overlay, and thereby degrade, the portion of the video image that relates to the transaction lane of interest. In the Playback mode of operation, a volume, or cassette 51, containing a record of the transactions to be reviewed is inserted into the VCR 50. The supervisor enters information at keyboard 62 relating to the toll booth to be reviewed which is sent over line 69 to the Image Record and Playback computer 40. This information is obtained, for example, from a printout of possibly irregular transactions as identified by the Irregular Transaction Identification computer 30. The Image Record and Playback computer 40 uses the information to select only the status and transaction data recorded on the audio channel of the VCR 50 that pertains to the toll booth of interest. Computer 40 sends the selected status and transaction data to the overlay video generator 60 along with information as to where that information can be displayed in alpha-numeric form so that it does not in any way degrade the clarity of the video image of the vehicle traffic through the toll booth being reviewed. This composite overlay image is displayed on monitor 64.

A typical alpha-numeric overlay display associated with a selected lane being reviewed would include: the name of the toll booth complex, the operator identification number, the lane number, the time the operator logged in at the booth, the date and time the data was recorded, the accumulated total number of vehicles for each vehicle classification number, the S6 and S7 treadle counts, the S6-S7 differential treadle count, the net treadle count, and the number of vehicle transactions as they are played back. All of this information takes up a considerable portion of the monitor screen, and if all of this information were recorded in alpha-numeric form on the tape for a large number of lanes, the clarity of the video image would be severely degraded. However, by limiting the display of transaction data to that of a single lane and selecting a location for display not in use by the reviewed lane such image degradation is avoided. Although the selection of a lane to be monitored had been described as taking place in a playback mode of operation it will be clear to one skilled in the art that an operator can monitor a single lane and cause the transaction information for that lane to be displayed in real time while the information for all lanes is being recorded on recorder 50.

Some of the blocks in FIG. 1 are standard, off the shelf items, while others are either special designs or modified off the shelf items. Standard items are listed as follows:

| Component | Manufacturer | Model |
| --- | --- | --- |
| camera 12 | Panasonic | WV-1410 |
| printer 36 | Panasonic | KX-P1180 |
| computer 30, 40 | AT & T | 6386E WGS |
| keyboard 32, 42 | AT & T | E03417212 |
| monitor 34, 44 | AT & T | CRT314 |
| keyboard 62 | JDR Microdevices San Jose, CA | BTC-5339 |
| monitor 64 | Panasonic | TR-930 |
| VCR 50 | Panasonic | PVS-4980 |

The message controllers 38,48 and the modem 66 have been designed by Data Based Systems, Camden, NJ. The overlay device 60 has been designed by KSI, a division of ODETICS, El Paso, Tex. and is identified as model V0100-PC.

It can be seen from FIG. 1 that all of the data that is transmitted from the lane controllers to computer 30 could just as well be transmitted to computer 40 or, in the alternative, that computer 40 could process the event transaction data that it receives to identify valid vehicle transactions and possibly irregular transactions. In other words, all of the functions performed by the Irregular Transaction Identification computer 30 could be performed by the Image Record and Playback computer 40.

Figure 2:
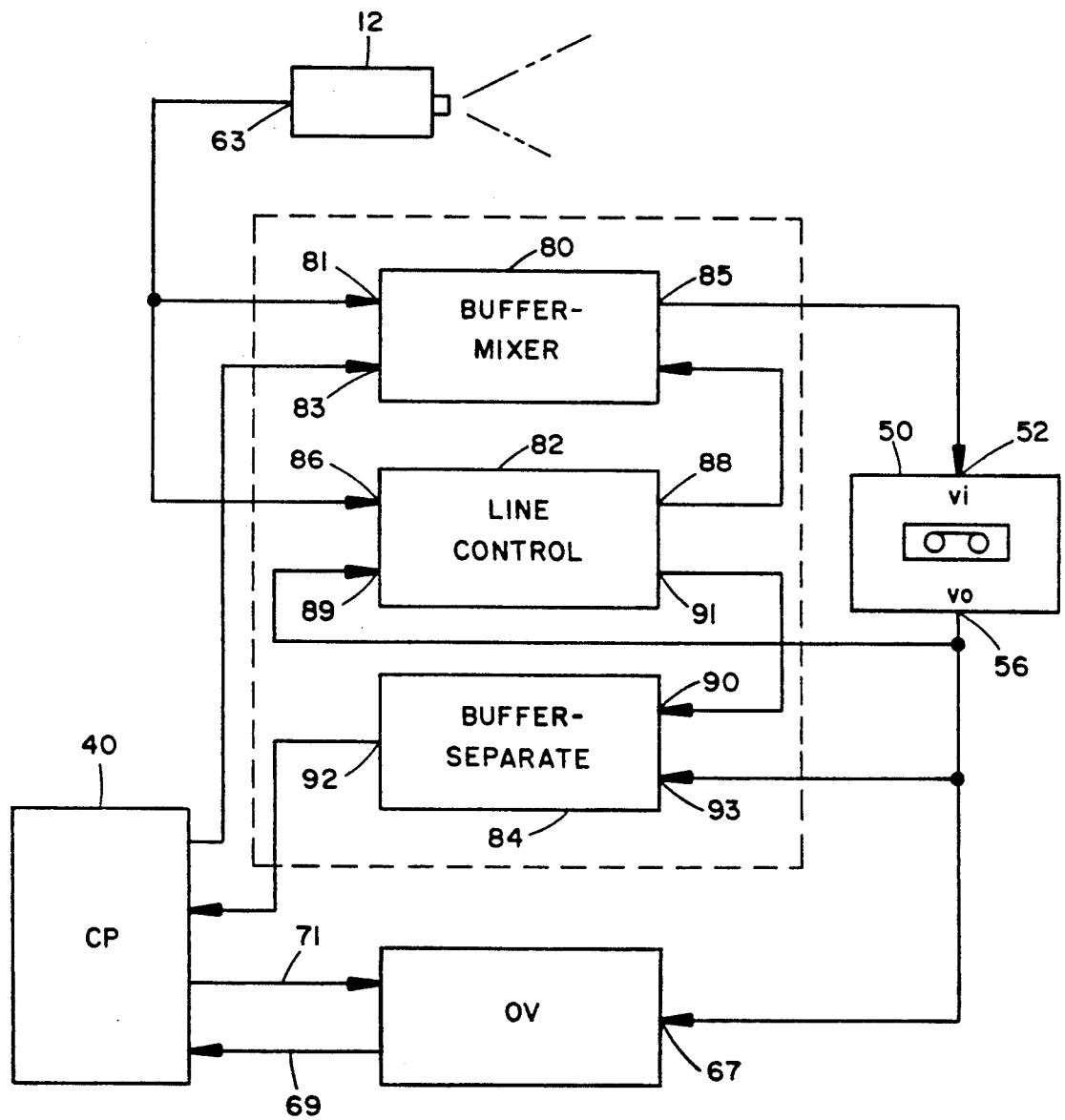
FIG. 2 is a schematic block diagram of an alternative system for recording transaction data on the recording medium.

FIG. 2 is a schematic block diagram showing how the system of FIG. 1 can be modified to provide an alternative method of recording the digital transaction data on the recording medium in a way that does not substantially alter the clarity of the video image of a transaction of interest. Elements described with respect to FIG. 1 retain the same reference designation in the description of subsequent figures. Instead of recording the digital transaction data on the audio channel of the recorder 50 as provided in FIG. 1, the digital transaction data are recorded in digital form in the first several (or last several) lines of the video frame where there is no meaningful video image relating to any transaction of interest. In FIG. 2, the video output 63 of the camera 12 is applied to the input 81 of buffer-mixer 80 and to the input 86 of line control unit 82. Any digital transaction data relating to the frame of video that is being recorded is transferred from the computer 40 to input 83 of the buffer-mixer 80 where the data is temporarily stored in a buffer register (not shown). Since the video signal from the camera 12 includes signals representing the end of a video frame as well as signals representing the end of each line of the video frame, line control unit 82 provides a signal at output 88 when the first several lines of the video frame are being generated by the camera 12 during which time the buffer-mixer 80 prevents the video output 63 of the camera 12 from being sent to the video recorder 50 and causes the buffered digital transaction data to appear at the output 85 and at the input 52 of the video recorder 50. After the first several lines of digital transaction data have been recorded, the buffer-mixer 80 will allow the video output 63 of the camera 12 to be passed through to the input 52 of the video recorder 50.

In the playback mode, the video output 56 of recorder 50 is applied to input 89 of line control unit 82, to input 93 of buffer-separator 84 and to input 67 of the overlay unit 60. The line control unit 82 functions as it did in the record mode to generate a control signal during the first several lines of any video frame during which time the digital transaction data, if any, is read into a buffer register (not shown) within buffer separator 84. If digital transaction data is present, it will be transferred to the computer 40.

Figure 3:
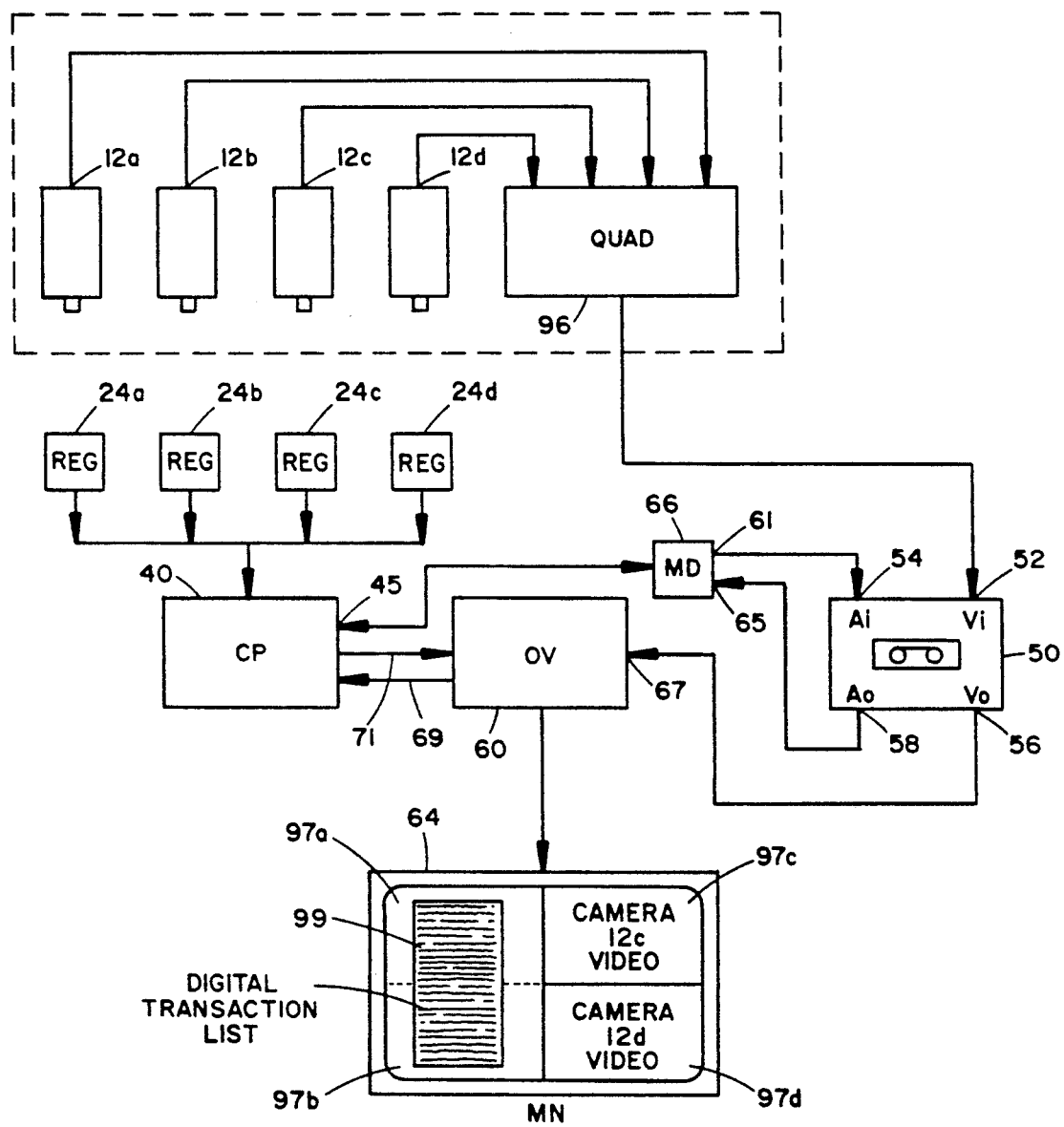
FIG. 3 is a schematic block diagram of an alternative system for recording transactions at a plurality of lanes on a single recording medium.

FIG. 3 shows an alternative approach for recording on a single volume, such as a video casette, of a recording medium the transactions from a plurality of cashier lanes that is particularly suitable to a supermarket or department store. It will be appreciated by one skilled in the art that for a typical supermarket, convenience store, or department store application, the system of FIG. 1 can be modified to eliminate the lane controllers 26 and the message coordinators 43 because the register 24 outputs can be bussed together and connected to a single computer 40 input/output channel.

As shown in FIG. 3, four cameras 12a-12d record the transactions that occur at four different cashier lanes. The cashier lanes might be located at one general location such as in a supermarket or might be located at different locations such as in a department store. The video output of each camera 12 is fed into a four quadrant multiplexer 96 which stores the video frames from each of the four cameras and reduces each frame to one-quarter screen size for recording at the video input 52 of recorder 50. Each cashier lane will have a cash register device 24a-24d, which in many stores includes a bar code scanner, that generates digital transaction data that is transmitted to computer 40. As in FIG. 1, the digital transaction data can be stored on the audio track of recorder 50. In the playback mode, the system of FIG. 3 operates in the same manner as the system of FIG. 1 in that the digital transaction data is read from the audio track of the tape and fed to the computer 40 via modem 66 and the combined four-picture video output 56 is fed to the overlay unit 60. As shown in FIG. 3, the video from camera 12a would normally be displayed in the upper left quadrant 97a of the monitor 64, and the video from cameras 12b, 12c, and 12d would normally be displayed in the lower left quadrant 97b, upper right quadrant 97c, and lower left quadrant 97d, respectively, of monitor 64.

As described for the system of FIG. 1, computer 40 of FIG. 3 causes the digital transaction data of the desired cashier lane to be displayed and controls the positioning of the digital transaction data so that it does not in any way affect the clarity of the video picture of the cashier lane of interest. Thus, as shown in FIG. 3, if the cashier lane of interest is the one monitored by camera 12c or 12d, the digital transaction data is displayed in the left half of the monitor screen. Similarly, if the cashier lane of interest is the one monitored by either camera 12a or 12b, the digital transaction data for the cashier lane of interest will be displayed on the right half of the monitor screen. If the monitored transactions take place in a supermarket, the displayed digital transaction data might be, as illustrated in FIG. 3, a replica of the cash register receipt that is given to the customer along with the time, date, register number, clerk identification number and an indication of which quadrant shows the cashier lane of interest.

Figure 4:
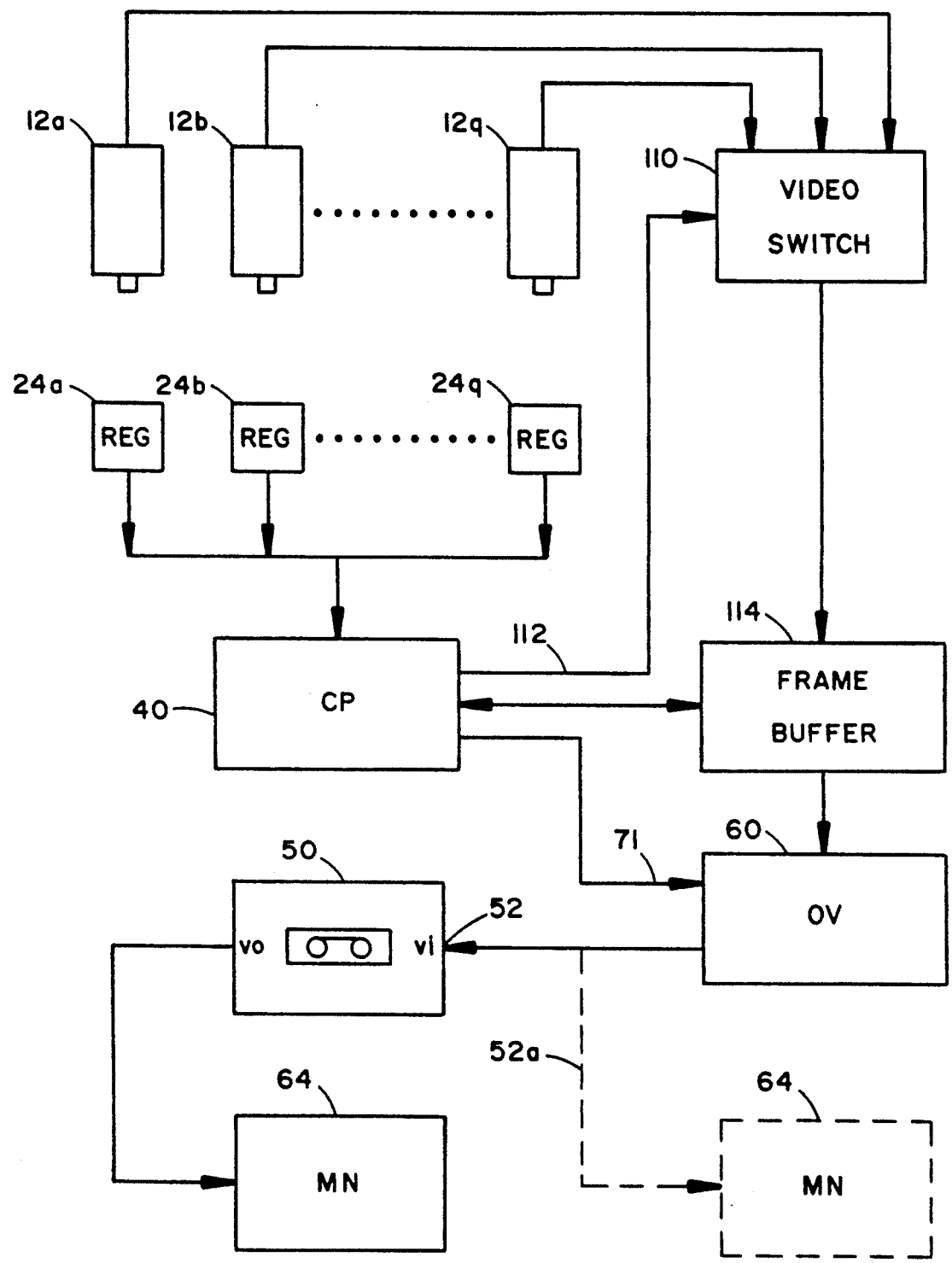
FIG. 4 is a block diagram of a system for providing summary snapshots of transactions from a plurality of transaction lanes on a single volume of a recording medium.

FIG. 4 shows another system for storing the video from a plurality of cashier lanes on a single volume of a recording medium. Instead of continuously recording the transactions at each of the cashier lanes (or in addition to such continous recording), a snapshot is taken at the beginning of the transaction at each cashier lane and when the transaction is completed, a brief summary of the transaction is written over the snapshot at a location that does not obscure the merchandise that is being purchased, thereby creating a single summary snapshot video frame of the transaction.

Referring now to FIG. 4, the transactions occurring at a number, q, of cashier lanes are monitored by cameras 12a-12q. The video output from each of the cameras 12a-12q is applied to a video switch 110. The registers 24a-24q associated with each cashier provides digital transaction data to the computer 40. If the cashier lanes are associated with a supermarket, the cashier lane counter is usually loaded with groceries when the cashier scans the first item. The computer 40 senses when the first item of a transaction is scanned in a particular lane, such as cashier lane a, and sends a signal over line 112 to the video switch 110 to cause the video frame being generated by the camera 12a to be passed to a video frame buffer 114.

Since a transaction may begin at another cashier lane before the transaction from cashier lane a is complete, frame buffer 114 is freed up by storing the contents of the frame buffer 114 in the memory of computer 40 until the transaction in lane a is complete. When computer 40 senses that the transaction in a cashier lane is complete (e.g., the printing of a "TOTAL"), the snapshot taken at the start of the transaction is read out of computer 40 back into the frame buffer 114. The output of the frame buffer 114 is applied to the input of overlay unit 60 and the summary of the transaction is sent from the computer 40 to the overlay unit 60 over line 71 where the digital summary is written an overlay with the snapshot taken at the start of the transaction. Under control of computer 40, the overwritten summary is placed so as not to affect the video image of the items on the lane conveyor, and the composite summary snapshot is applied to the video input 52 of the recorder 50. As an example of the information that might be included in the summary overlay is : number of items, coupon redemption amount, and total transaction amount. In the event that the transaction contains an unusually large number of items, it would also be possible to take several snapshots for example after 15 items, with an intermediate summary, of such a transaction.

In the embodiment of FIG. 4, the composite frame formed of the image video with an overlay of summary data is recorded on the tape 51 (or mass storage disc). These snapshot frames are stored as overlayed composite frames for operator review using the monitor 64 without further aid of the computer 40. In the playback mode, the snapshots are reviewed to identify either erroneous or otherwise questionable transactions, however, as indicated by the dashed line 52a, the snapshots can also be viewed on the monitor 64a as they occur.

Thus, it is apparent from the above description that this invention provides a surveillance recording system in which single or multiple cameras simultaneously record transactions that occur at a plurality of lanes or other transaction stations as a frame of video on a single volume of recording tape. Pictures from cameras can further be recorded combined as inserts on multi-camera displays (video quads with four pictures in four quadrants) or in sequential time-multiplexed order by video multiplexers on a single volume of video tape, thereby recording the maximum number of transaction images on a single recorder. The invention provides a means for visually summarizing each transaction recorded as a single snapshot summary video frame. This is accomplished by storing the transaction picture as a frame of video when the first item in a transaction is entered. At the completion of the transaction the final totals and statistics describing the transaction are written on the video frame or stored in locations in memory that link the statistics to the video frame. A means is provided for assuring that the digital data recorded are in synchrony with the events recorded in the video pictures; in one example, by recording the events and the data simultaneously.

Made possible are the recording for replay of the picutres and data associated with all transactions, that take place every eight hours at any location or site where transactions occur. For example, these recordings serve as documentation that can be used to reconstruct events and provide audit trails for labor and management.

While the present invention has been described with respect to a specific embodiment thereof, it will be obvious to those skilled in the art that various changes and modifications can be made without departing from the invention in its broader aspects.

What is claimed as new and desired to be secured by Letters Patent of the United States is:

1. A system for making and reviewing video recordings of transactions occurring at a plurality of cashier lanes comprising:
    (a) camera means for developing frames of video signals depicting transactions at two or more cashier lanes;
    (b) sensor means at each lane responsive to activity at the lane for generating digital signals representing events that occur;
    (c) first means, including a computer, responsive to the digital signals from the sensor means in each lane for generating a digital transaction signal;
    (d) recording means responsive to the camera means video signal and the computer digital transaction signal for recording the transaction on a recording medium, the digital transaction signal being recorded so as to substantially not affect the clarity of each video frame;
    (e) means for playing back the recording medium and generating a playback video frame signal and a playback digital transaction signal, said first means computer being responsive to the playback digital transaction signal and a desired cashier lane signal, and generating an overlay control signal,
    wherein the recording means has an audio input and wherein an input/output channel of the computer is connected to a modem and the modem is connected to the audio input and output channels of the playback means whereby the digital transaction data is recorded on an audio channel of the recording medium and the playback digital transaction data is transferred to the computer;
    (f) overlay means responsive to the overlay control signal and the playback video frame signal for providing a composite video signal comprising an alpha-numeric information display of the digital transaction information relating to the desired cashier lane overlaying the video signal, said alpha-numeric information being thereby positioned in the composite video signal so as to preserve the clarity of that portion of the video frame signal that pertains to the desired cashier lane; and
    (g) a monitor responsive to the composite video signal for displaying a picture and text describing transactions that occur at the desired cashier lane.

2. The system of claim 1 wherein the sensor means is a cash register.

3. The system of claim 2 wherein the first means includes a multiplexer responsive to the digital signals for providing the digital transaction data to the computer over a data channel.

4. The system of claim 3 further comprising a positioning means responsive to the overlay control signal and the playback video frame signal for placing the alphanumeric information in any desired position on the monitor.

5. The system of claim 1 wherein the first means includes a multiplexer responsive to the digital signals for providing the digital transaction data to the computer over a data channel.

6. The system of claim 5 further comprising a positioning means responsive to the overlay control signal and the playback video frame signal for placing the alphanumeric information in any desired position on the monitor.

7. The system of claim 1 wherein the camera means is a single television camera viewing the transactions that occur at a plurality of cashier lanes.

8. The system of claim 1 further comprising a positioning means responsive to the overlay control signal and the playback video frame signal for placing the alphanumeric information in any desired position on the monitor.

9. The system of claim 1 wherein the recording means is a videocassette recorder.

10. A system for making and reviewing video recordings of transactions occurring at a plurality of cashier lanes comprising:
- (a) camera means for developing frames of video signals depicting transactions at two or more cashier lanes; wherein the camera means further comprises:
  - (i) a camera at each cashier lane for generating a frame of video signals of transactions occurring at the cashier lane; and
  - (ii) reducer/mixer means responsive to the video frame signals from each camera for generating a combined video signal in which the picture from each camera is reduced in size, said recording means being responsive to the reducer/mixer combined video signal;
- (b) sensor means at each lane responsive to activity at the lane for generating digital signals representing events that occur;
- (c) first means, including a computer, responsive to the digital signals from the sensor means in each lane for generating a digital transaction signal;
- (d) recording means responsive to the camera means video signal and the computer digital transaction signal for recording the transaction on a recording medium, the digital transaction signal being recorded so as to substantially not affect the clarity of each video frame;
- (e) means for playing back the recording medium and generating a playback video frame signal and a playback digital transaction signal, said first means computer being responsive to the playback digital transaction signal and a desired cashier lane signal, and generating an overlay control signal;
- (f) overlay means responsive to the overlay control signal and the playback video frame signal for providing a composite video signal comprising an alpha-numeric information display of the digital transaction information relating to the desired cashier lane overlaying the video signal, said alphanumeric information being thereby positioned in the composite video signal so as to preserve the clarity of that portion of the video frame signal that pertains to the desired cashier lane; and
- (g) a monitor responsive to the composite video signal for displaying a picture and text describing transactions that occur at the desired cashier lane.

11. The system of claim 10 wherein the sensor means is a cash register.

12. The system of claim 11 wherein the first means includes a multiplexer responsive to the digital signals for providing the digital transaction data to the computer over a data channel.

13. The system of claim 12 further comprising a positioning means responsive to the overlay control signal and the playback video frame signal for placing the alphanumeric information in any desired position on the monitor.

14. The system of claim 10 wherein the first means includes a multiplexer responsive to the digital signals for providing the digital transaction data to the computer over a data channel.

15. The system of claim 14 further comprising a positioning means responsive to the overlay control signal and the playback video frame signal for placing the alphanumeric information in any desired position on the monitor.

16. The system of claim 10 wherein the camera means is a single television camera viewing the transactions that occur at a plurality of cashier lanes.

17. The system of claim 10 further comprising a positioning means responsive to the overlay control signal and the playback video frame signal for placing the alphanumeric information in any desired position on the monitor.

18. The system of claim 10 wherein the recording means is a videocassette recorder.

* * * * *